(12) United States Patent
Misawa et al.

(10) Patent No.: US 7,590,337 B2
(45) Date of Patent: Sep. 15, 2009

(54) IMAGE-TAKING DEVICE

(75) Inventors: Atsushi Misawa, Asaka (JP); Hitoki Miyaishi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 388 days.

(21) Appl. No.: 11/328,096

(22) Filed: Jan. 10, 2006

(65) Prior Publication Data

US 2006/0153554 A1 Jul. 13, 2006

(30) Foreign Application Priority Data

Jan. 13, 2005 (JP) ............................. 2005-006648

(51) Int. Cl.
*G03B 17/00* (2006.01)
(52) U.S. Cl. .................. 396/55; 396/281; 396/287; 396/291; 348/208.11; 348/208.15
(58) Field of Classification Search .................. 396/55, 396/52, 134, 281, 287–288, 290–292; 348/208.11, 348/208.99, 208.4, 208.15
See application file for complete search history.

(56) References Cited

U.S. PATENT DOCUMENTS

| 5,602,675 | A | * | 2/1997 | Okada .......................... 359/554 |
| 6,101,332 | A | * | 8/2000 | Satoh .............................. 396/52 |
| 6,233,009 | B1 | * | 5/2001 | Morofuji et al. .......... 348/208.8 |
| 6,295,412 | B1 | * | 9/2001 | Katano et al. ................. 396/55 |
| 6,366,735 | B1 | * | 4/2002 | Sato ............................ 396/55 |
| 7,209,165 | B2 | * | 4/2007 | Ishikawa ............... 348/208.99 |
| 2002/0147033 | A1 | * | 10/2002 | Ban et al. ................... 455/566 |
| 2003/0222867 | A1 | * | 12/2003 | Bean et al. ................... 345/211 |

FOREIGN PATENT DOCUMENTS

| JP | 2000-39640 A | 2/2000 |
| JP | 2002-27542 A | 1/2002 |
| JP | 2002-51119 A | 2/2002 |
| JP | 2004-159051 A | 6/2004 |

* cited by examiner

*Primary Examiner*—Rodney E Fuller
*Assistant Examiner*—Linda B Smith
(74) *Attorney, Agent, or Firm*—Sughrue Mion, PLLC

(57) ABSTRACT

An image-taking device is capable of effectively utilizing a shake correcting section and thereby shooting an image with little blur. The image-taking device includes: an angular rate sensor which detects a shake; a shift lens which travels within a predetermined moving range to correct the shake; a shift lens driving section which pulls the shift lens, which has moved to a biased position from a predetermined center, back to the center; a central processing unit which calculates a correction effect for the shake; and a liquid crystal monitor. The central processing unit calculates the correction effect based on a distance between the position of the moved shift lens and the center, and displays the correction effect on the liquid crystal monitor.

10 Claims, 12 Drawing Sheets

IMAGE-TAKING DEVICE

BACKGROUND OF THE INVENTION

1. Field of the Invention

The present invention relates to an image-taking device configured to focus an object image on an image pickup device by use of an image-taking optical system and to generate an image signal for a recording purpose in response to a shooting instruction.

2. Background of the Related Art

Image-taking devices such as digital cameras or video cameras including shake correcting sections for correcting shakes at the time of shooting images have heretofore been diffused. A shake correcting section for instance includes a lens member (a shift lens) disposed in the way of a light path of light from an object which is incident on an image pickup device, and an angular rate sensor such as a vibration gyrosensor. An image-taking device including this shake correcting section is configured to correct shakes at the time of shooting images by moving the shift lens within a given moving range and thereby displacing an optical axis so as to correct a shake detected by the angular rate sensor.

As an example of the image-taking devices, there is disclosed a video camera which is capable of achieving the most suitable panning characteristic constantly by identifying whether the video camera used for shooting is held in hands, mounted on a vehicle or fixed on a tripod and modifying a limitation characteristic for limiting a shake correcting operation accordingly (see Japanese Unexamined Patent Application Publication No. 2000-39640).

Meanwhile, there is also disclosed a digital camera configured to perform highly accurate shake correction by judging whether a user is shooting an image through a viewfinder by use of an eyepiece detecting section and switching shake correction characteristics accordingly (see Japanese Unexamined Patent Application Publication No. 2004-159051).

In these image-taking devices, the shift lens has a limitation in terms of the moving range for correcting shakes. Here, a large shake may occur and such a shake may exceed the moving range. When an image is shot in this state, a photograph thus taken will be quite blurry.

There is also a limitation in terms of response of a driving section including the shift lens. For this reason, when shakes occur frequently, such a mechanism may fail to follow the shakes. When an image is shot in this state, a photograph thus taken will be also blurry.

As described above, a conventional image-taking device may include the shake correcting section but may still cause a blurry photograph when an image is shot at the time of a large shake or in the course of frequent shakes. Accordingly, such a conventional image-taking device has a problem in making effective use of the shake correcting section.

SUMMARY OF THE INVENTION

The present invention has been made in view of the above circumstances and provides an image-taking device which is capable of effectively utilizing a shake correcting section and thereby shooting an image with little blur.

An image-taking device of the present invention is configured to focus an object image on an image pickup device by use of an image-taking optical system and to generate an image signal for recording in response to a shooting instruction. Here, the image-taking device includes a shake correcting section which corrects a shake when shooting an image. Further, the shake correcting section includes a shake detecting section which detects the shake, a correcting member which travels within a predetermined moving range and corrects the shake, a correcting member driving section which moves the correcting member so as to correct the shake detected by the shake detecting section, a correction effect calculating section which calculates a correction effect for the shake, and a correction effect displaying section which displays the correction effect obtained by the correction effect calculating section.

The image-taking device of the present invention is configured to calculate the correction effect for the shake and to display the calculated correction effect. Accordingly, when a large shake is generated or frequent shakes are generated, it is possible to display an indication of reduction in the correction effect by the shake correcting section for correcting a shake at the time of shooting an image as described later in embodiments. Therefore, a user can delay timing for shooting an image, zoom in with a zoom lens from a telescopic side to a wide-angle side, grip the image-taking device tightly, and carry out other measures. In this way, the shake correcting section is effectively utilized and the user can shoot an image with little blur.

Here, the correcting member driving section is preferably configured to pull the correcting member, which has moved to a biased position from a predetermined center, back to the center after shooting an image, and the correction effect calculating section is preferably configured to calculate the correction effect based on a distance between the biased position of the correcting member and the center.

In this way, it is possible to calculate the correction effect easily based on the distance between the biased position of the correcting member and the center.

Meanwhile, it is also preferable that the correcting member driving section is configured to pull the correcting member, which has moved to a biased position from a predetermined center, back to the center after shooting an image by use of a pullback force corresponding to a distance between the biased position of the correcting member and the center, and the correction effect calculating section is preferably configured to calculate the correction effect based on the pullback force.

In this way, it is possible to pull the correcting member back to the predetermined center while increasing the pullback force as the correcting member moves away from the predetermined center, and to calculate the correction effect by use of the pullback force as a parameter. Therefore, it is possible to pull back the correcting member in a short time period and to calculate the correction effect easily.

In addition, the shake correcting section preferably has the correction effects at different levels depending on a frequency of the shake, while the shake detecting section is preferably configured to detect the shake depending on each of frequency components, and the correction effect calculating section is preferably configured to calculate the correction effect for the shake based on the shake depending on each of frequency components detected by the shake detecting section and the level of the correction effect corresponding to the frequency of the shake achieved by the shake correcting section.

In this way, when the correction effect upon receipt of the shooting instruction is calculated based on the frequency of the shake, a user can pay attention not to generate vibration which may adversely affect image shooting, or can avoid image shooting under a condition where there is a large amount of vibration.

Meanwhile, the correction effect calculating section may be configured to calculate the correction effect based on an integrated value of a predetermined period in the past.

Here, the integrated value may be equal to an integrated value of the distance between the position of the moved correcting member and the center or an integrated value of the pullback force corresponding to the distance between the position of the moved correcting member and the center. Alternatively, the integrated value may be equal to an integrated value of the shake depending on each of the frequency components.

Moreover, the correction effect calculating section may be configured to calculate the correction effect by use of multiple samplings including the present.

Furthermore, the correction effect calculating section may be configured to calculate the correction effect by use of multiple samplings excluding the present.

Here, the sampling may be equivalent to a sampling of the distance between the position of the moved correcting member and the center or a sampling of the pullback force corresponding to the distance between the position of the moved correcting member and the center. Alternatively, the sampling may be equivalent to a sampling of the shake depending on each of the frequency components.

According to the image-taking device of the present invention, it is possible to achieve effective use of the shake correcting section and thereby to shoot an image with little blur.

DETAILED DESCRIPTION OF THE PREFERED EMBODIMENTS

Now, embodiments of the present invention will be described below.

Figure 1:
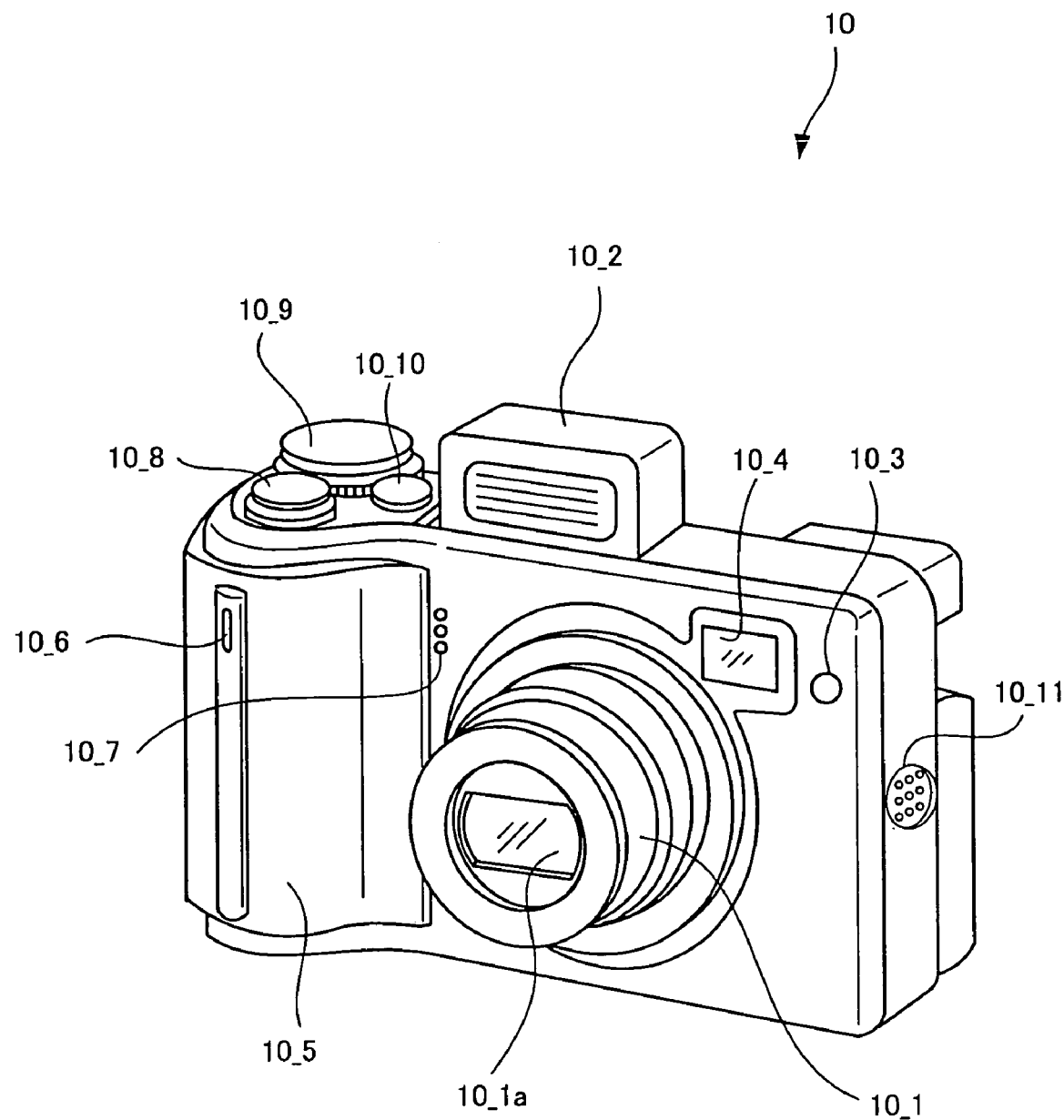
FIG. 1 is an external perspective view of a digital camera representing an image-taking device according to a first embodiment of the present invention, which is viewed obliquely from above and from a front side.

FIG. 1 is an external perspective view of a digital camera representing an image-taking device according to a first embodiment of the present invention, which is viewed obliquely from above and from a front side.

A digital camera 10 shown in FIG. 1 is an image-taking device configured to form an object image on an image pickup device by use of an image-taking optical system and to generate an image signal for recording in response to a shooting instruction, which includes a shake correcting section which corrects a shake when shooting an image. The shake correcting section will be described later.

A zoom lens barrel 10_1 incorporating a shooting lens 10_1a being an optical zoom lens is disposed at a central part on a front face of the digital camera 10 shown in FIG. 1. Moreover, a flash light emission device 10_2 which emits flash light synchronously with a shooting operation, a flash light adjustment sensor 10_3 which detects an amount of the flash light for controlling the amount of the flash light from the flash light emission device 10_2, and an optical finder objective window 10_4 are disposed on an upper part on the front face of this digital camera 10.

Further, a grip 10_5 having a shape to allow a user to surely grab this digital camera 10, a self-timer lamp 10_6 which blinks at the time of operating a self-timer and the like, and a microphone 10_7 which picks up voices are disposed on a left side on the front face of this digital camera 10.

In addition, a shutter button 10_8, a mode dial 10_9 for setting various modes, and a power button 10_10 are disposed on an upper face of this digital camera 10.

Moreover, a speaker 10_11 is disposed on a right side face of this camera 10 as shown in FIG. 1.

Figure 2:
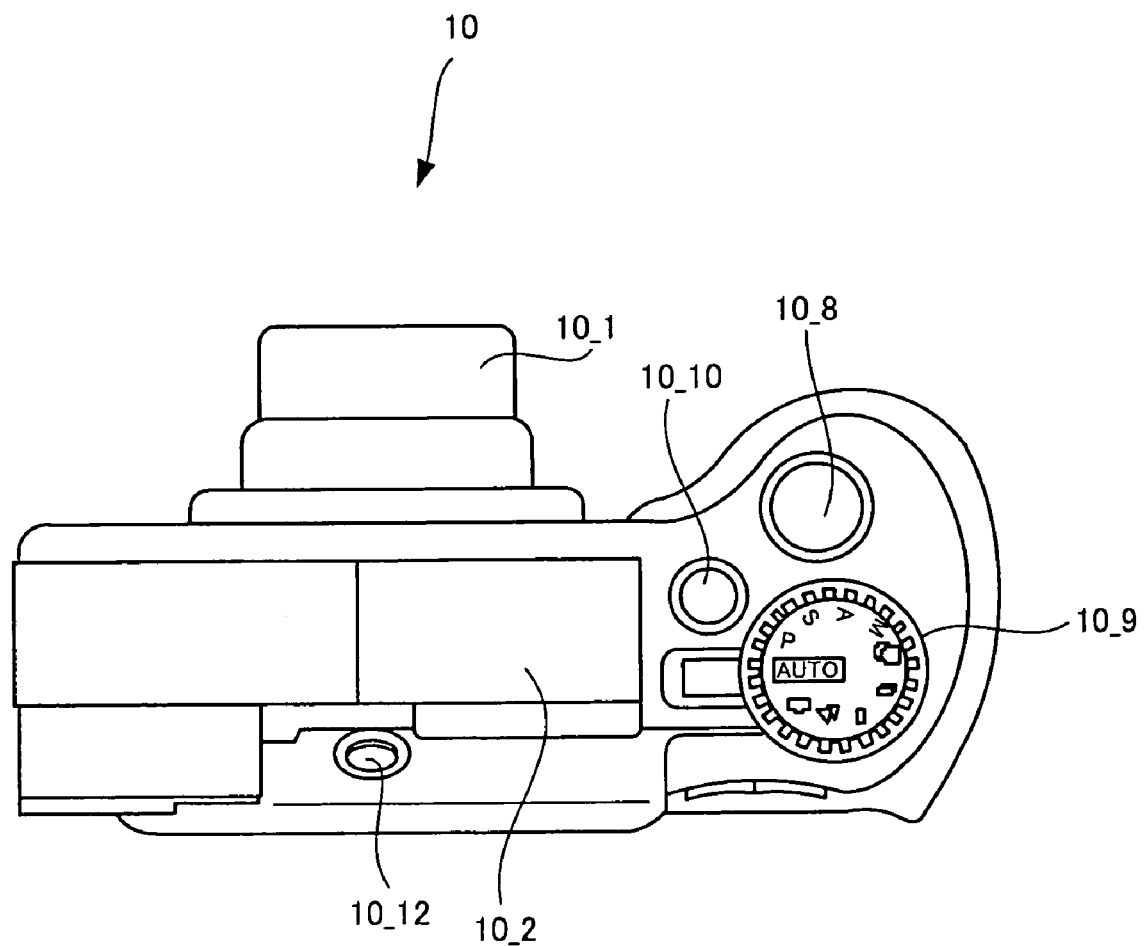
FIG. 2 is an external view of the digital camera shown in FIG. 1 which is viewed from above.

FIG. 2 is an external view of the digital camera shown in FIG. 1 which is viewed from above.

In addition to the flash light emission device 10_2, the shutter button 10_8, the mode dial 10_9 and the power button 10_10, this digital camera 10 includes a pop-up button 10_12 for popping up the flash light emission device 10_2, which is disposed on an inclined surface provided from an upper part to a lower part of this digital camera 10. Meanwhile, letters AUTO indicating an automatic mode, a letter P indicating a program automatic mode, a letter S indicating a shutter speed preferential automatic mode, a letter A indicating an aperture preferential automatic mode, a letter M indicating a manual mode, a picture indicating a moving image mode, and four pictures respectively indicating four scene positions (scene positions for nightscape, sport, landscape, and portrait) are printed on the mode dial 10_9. It is possible to set up a desired mode by rotating this mode dial 10_9. Now, the respective modes will be described below.

The automatic mode (AUTO) is a mode for allowing the camera to control all parameters including exposure, white balance, and the like.

The program automatic mode (P) is a mode for automatically setting up the shutter speed and the aperture.

The shutter speed preferential automatic mode (S) is a mode for preferentially setting up the shutter speed.

The aperture preferential automatic mode (A) is a mode for preferentially setting up the aperture.

The manual mode (M) is a mode for setting up the shutter speed and the aperture freely.

The moving image mode indicated with the picture next to the manual mode (M) is a mode for shooting a moving image.

Moreover, there are the four scene position modes for selecting any one of the four shooting scenes (nightscape, sport, landscape, and portrait), which are arranged clockwise from this moving image mode.

The nightscape scene position mode is a mode suitable for shooting an image while emphasizing an ambience such as an evening view or a night view.

The sport scene position mode is a mode suitable for shooting an image of a moving object, which is typified by a sport scene.

The landscape scene position mode is a mode suitable for shooting an image of a landscape such as a building or a mountain in daytime.

The portrait scene position mode is a mode suitable for shooting a portrait image optimized to capture a flesh color beautifully.

Figure 3:
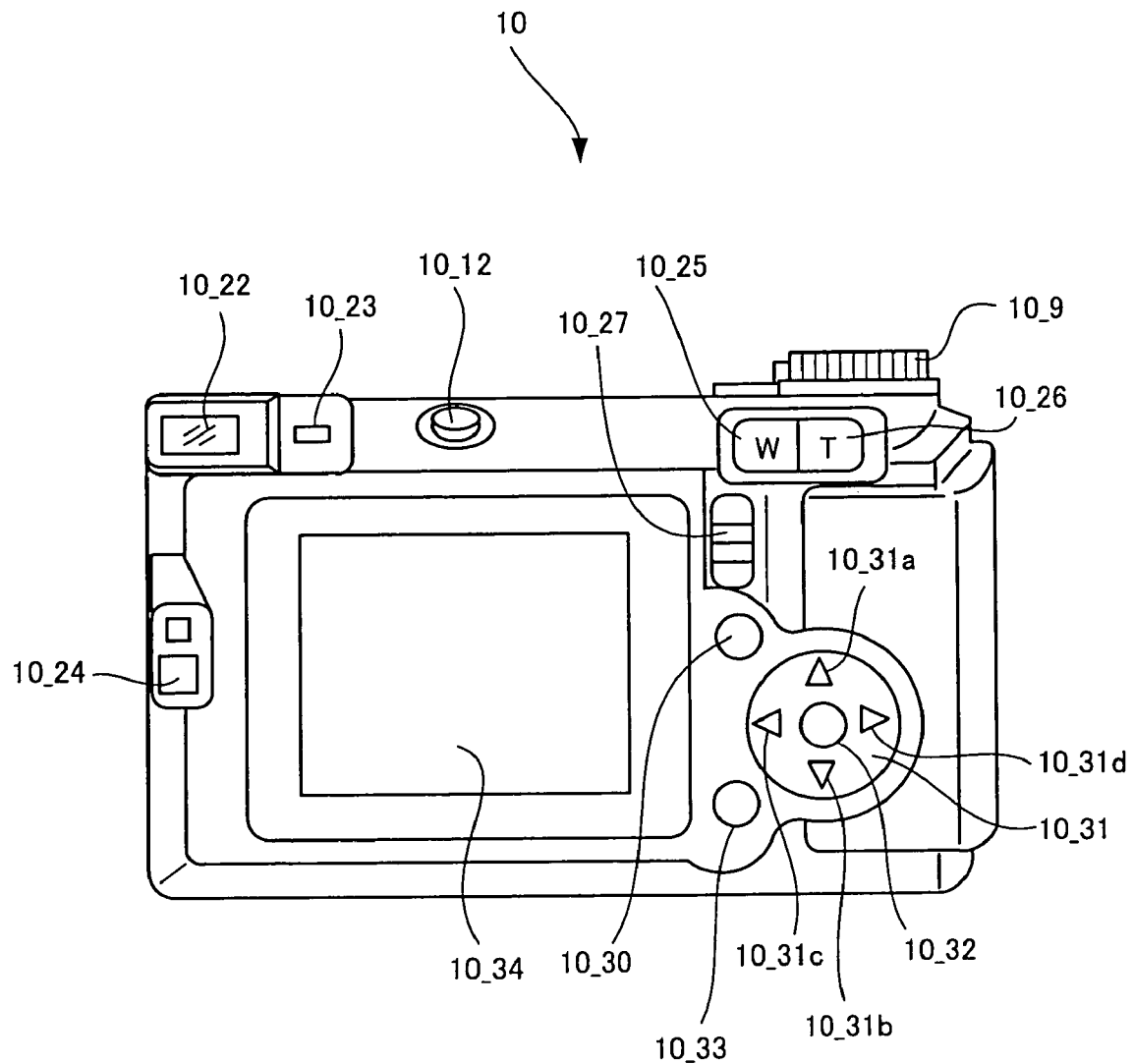
FIG. 3 is an external view of the digital camera shown in FIG. 1 which is viewed from a back side.

FIG. 3 is an external view of the digital camera shown in FIG. 1 which is viewed from a back side.

An optical finder eyepiece window 10_22, a finder lamp 10_23 configured to be turned on at the time of completing preparation for shooting or to blink in the course of shooting an image, an exposure correction button 10_24, a wide-angle zoom button 10_25 for zooming in to a wide-angle side when pressed down, a telescopic zoom button 10_26 for zooming out to a telescopic side when pressed down, and a mode switch 10_27 which switches between a shooting mode and a playback mode are disposed on an upper part on the back face of the digital camera shown in FIG. 3.

Meanwhile, a photographic mode button 10_30, an arrow button 10_31, a MENU/OK button 10_32, and a DISP/BACK button 10_33 are disposed under the mode switch 10_27. In addition, a liquid crystal monitor 10_34 is disposed at a central part on the back face of the digital camera 10.

The photographic mode button 10_30 is a button for setting up the number of pixels, sensitivity, colors, the number of prints, and the like.

When a menu screen or the like is displayed on the liquid crystal monitor 10_34, the arrow key 10_31 allows selection in accordance with the menu by operating four buttons of an upper button 10_31a, a lower button 10_31b, a left button 10_31c, and a right button 10_31d. Meanwhile, the left button 10_31c also functions as a button for selecting a macro shooting mode. When the left button 10_31c is pressed down, the shooting mode is switched to the macro shooting mode. The macro shooting mode is released when the left button 10_31c is pressed down again. Moreover, the right button 10_31d also functions as a flash button. The right button 10_31d is the button for switching the state of the flash circularly from an automatic flash, to a red-eye reduction flash, to a forcible flash, to no flash, to a slow synchronous flash, and then back to the automatic flash every time the button is pressed down.

The MENU/OK button 10_32 is the button for displaying various menus at the time of shooting or playing back an image and for confirming a selected menu.

The DISP/BACK button 10_33 functions as both of a DISP button and a BACK button. In the case of the DISP button, the DISP/BACK button 10_33 functions as the button for switching the state of a screen displayed on the liquid crystal monitor 10_34, and is used for turning a display image on the liquid crystal monitor 10_34 on or off at the time of shooting an image or turning a character display on or off at the time of playback, for example. On the contrary, in the case of the BACK button, the DISP/BACK button 10_33 functions as the button for placing the state of operation attributable to the MENU/OK button 10_32 and the like back to the previous state or for canceling the current state of operation.

The liquid crystal monitor 10_34 displays an image made of image data generated as a result of capturing light from an object with the digital camera 10, information at the time of setting up the various modes, and the like. Here, this liquid crystal monitor 10_34 serves as a correction effect displaying section of the present invention.

Figure 4:
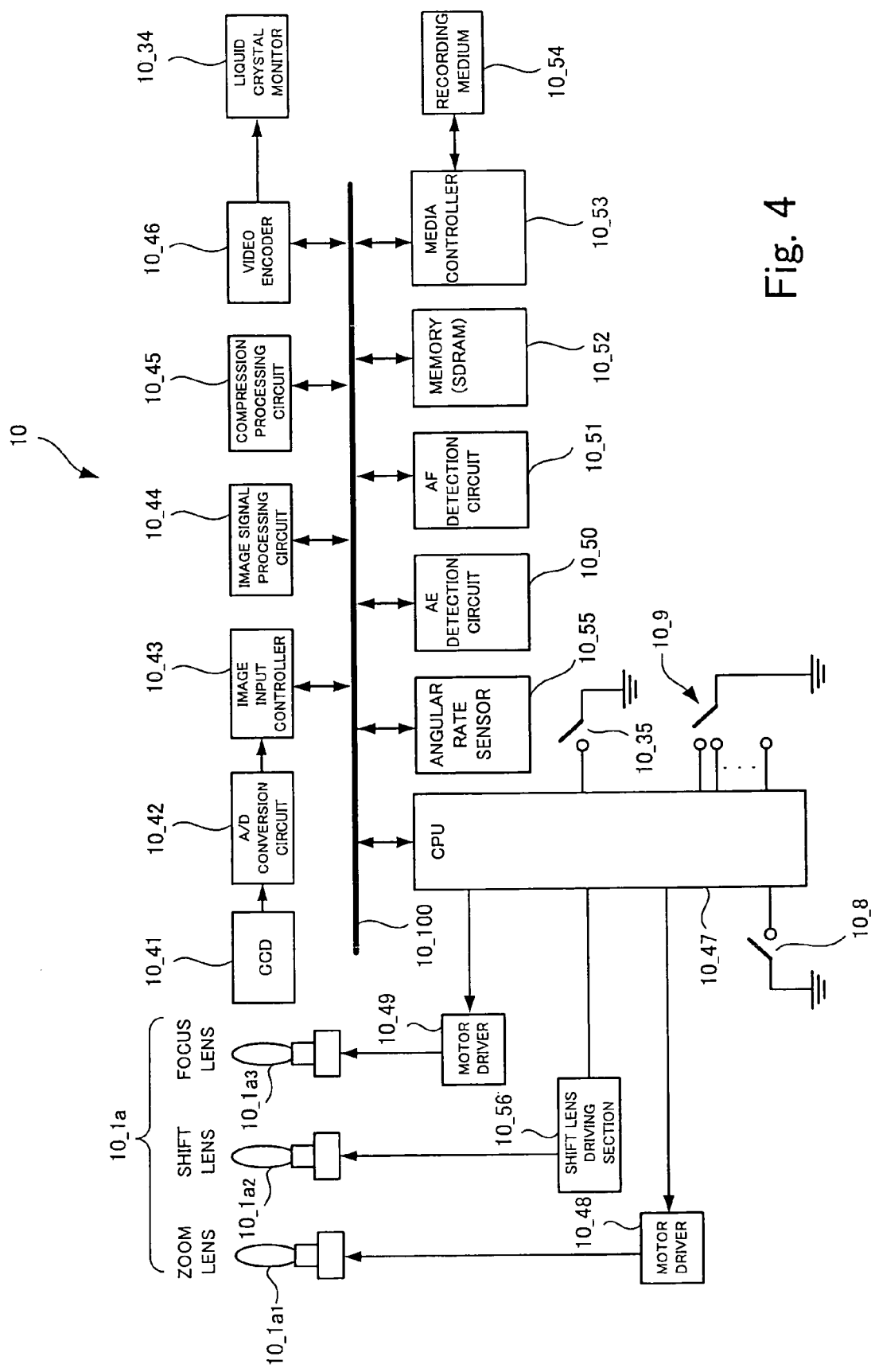
FIG. 4 is a block diagram showing a circuit configuration of the digital camera shown in FIG. 1.

FIG. 4 is a block diagram showing a circuit configuration of the digital camera shown in FIG. 1.

This digital camera 10 includes a zoom lens $10\_1a_1$, a shift lens $10\_1a_2$, and a focus lens $10\_1a_3$, which collectively constitute the shooting lens 10_1a.

Here, the shift lens $10\_1a_2$ corresponds to an example of a correcting member of the present invention which travels within a predetermined moving range and corrects a shake.

Meanwhile, this digital camera 10 includes an image pickup device (a charge-coupled device; hereinafter referred to as a CCD) 10_41 which converts an object image focused via the shooting lens 10_1a into an analog signal.

In addition, this digital camera 10 includes an analog/digital (A/D) converter circuit 10_42 which converts the analog image signal from the CCD 10_41 into a digital signal, and an image input controller 10_43 which transmits the digital image signal from the A/D converter circuit 10_42 to a bus line 10_100.

This digital camera 10 further includes an image signal processing circuit 10_44. This image signal processing circuit 10_44 converts the digital image signal inputted via the bus line 10_100 into a YC signal expressed by brightness (Y) and color (C).

Meanwhile, this digital camera 10 includes a compression processing circuit 10_45 which performs compression processing of the YC signal inputted via the bus line 10_100, and a video encoder 10_46 which converts the YC signal inputted via the bus line 10_100 into an NTSC (which stands for National TV Standards Committee) signal. The NTSC signal outputted from the video encoder 10_46 is supplied to the liquid crystal monitor 10_34, whereby the liquid crystal monitor 10_34 displays an image.

In addition, the digital camera 10 includes a central processing unit (CPU) 10_47 which controls the entire digital camera 10, motor drivers 10_48 and 10_49 which drive the zoom lens $10\_1a_1$ and the focus lens $10\_1a_3$, and the shutter button 10_8. Here, the CPU 10_47 serves as a correction effect calculating section of the present invention which calculates a correction effect for a shake. To be more precise, this CPU 10_47 calculates the correction effect based on a distance between a position of the moved shift lens $10\_1a_2$ and a predetermined center. The calculated correction effect is displayed on the liquid crystal monitor 10_34.

Meanwhile, this digital camera 10 includes an auto exposure (AE) detection circuit 10_50 which detects brightness of field based on the digital image signal.

Moreover, this digital camera 10 includes an auto focus (AF) detection circuit 10_51 which brings the digital camera 10 into focus on the maximum contrast point by contrast detection based on the digital image signal.

Further, this digital camera 10 includes a memory (a synchronous dynamic random access memory or an SDRAM) 10_52 which records the digital image signal, and a media controller 10_53 which records the YC signal compressed by the compression processing circuit 10_45 in a recording medium 10_54 that is a portable recording medium.

In addition, this digital camera 10 includes an angular rate sensor 10_55. This angular rate sensor 10_55 corresponds to an example of a shake detecting section of the present invention which detects the shake.

Furthermore, the digital camera 10 includes a shift lens driving section 10_56 (corresponding to an example of a correcting member driving section of the present invention) which moves the shift lens 10_1$a_2$ so as to correct the shake detected by the angular rate sensor 10_55. To be more precise, this shift lens driving section 10_56 is configured to pull the shift lens 10_1$a_2$, which has moved to a biased position from the predetermined center, back to the center after shooting an image. Here, the angular rate sensor 10_55, the shift lens 10_1$a_2$, the shift lens driving section 10_56, and the CPU 10_47 functioning as the correction effect calculating section, and the liquid crystal monitor 10_34 for displaying the correction effect collectively constitute an example of a shake correcting section of the present invention which corrects a shake when shooting an image.

Figure 5:
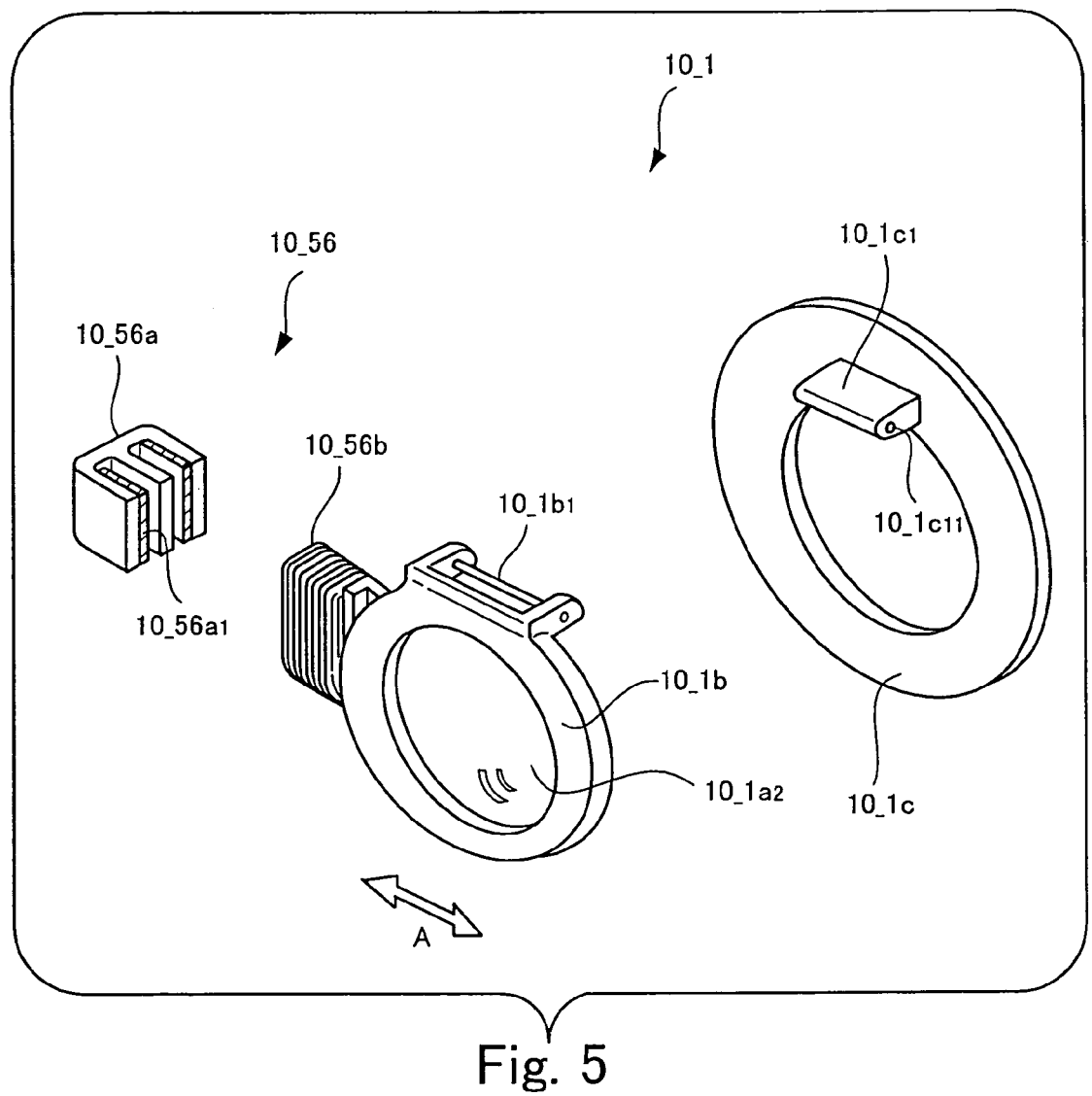
FIG. 5 is a view showing a configuration of a shift lens driving section shown in FIG. 4.

FIG. 5 is a view showing a configuration of the shift lens driving section shown in FIG. 4.

The shift lens driving section 10_56 shown in FIG. 5 includes a yoke 10_56$a$ having a magnet 10_56$a$, attached thereto and a voice coil 10_56$b$.

Moreover, FIG. 5 shows a lens frame 10_1$b$ and a base member 10_1$c$, which collectively constitute the zoom lens barrel 10_1. The voice coil 10_56$b$ is attached to the lens frame 10_1$b$, and the shift lens 10_1$a_2$ is fitted therein. Meanwhile, this lens frame 10_1$b$ includes a straight guide bar 10_1$b_1$.

Meanwhile, the base member 10_1$c$ includes a straight guide member 10_1$c_1$ having a through hole 10_1$c_{11}$, and the straight guide bar 10_1$b_1$ is movably inserted to this through hole 10_1$c_{11}$ in a direction indicated by an arrow A (a lateral direction of the digital camera 10) relative to a direction of an optical axis.

In this shift lens driving section 10_56, the CPU 10_47 controls a current flowing on the voice coil 10_56$b$ so as to correct the shake in the lateral direction detected by the angular rate sensor 10_55. In this way, the shift lens 10_1$a_2$ travels in the lateral direction.

Figure 6:
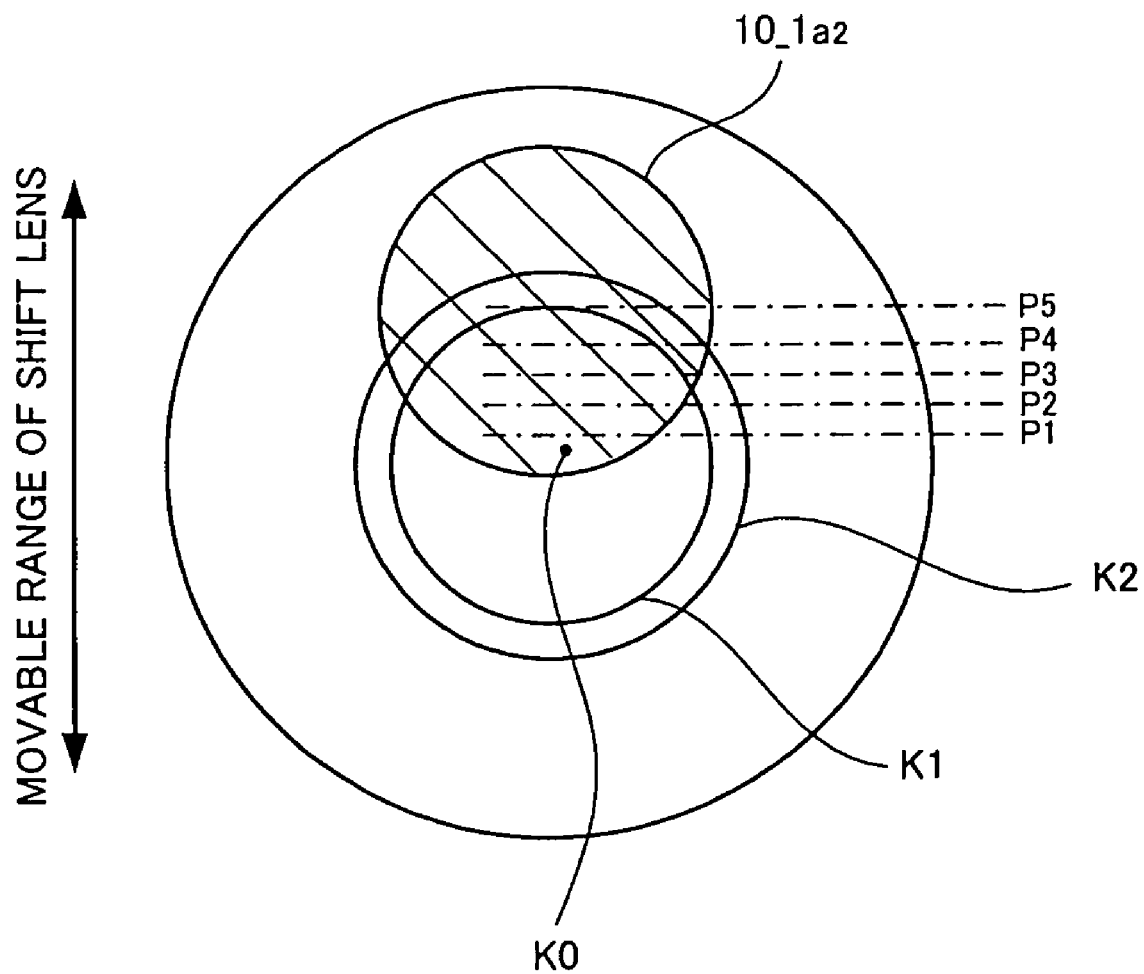
FIG. 6 is a view showing a movable range of a shift lens.

FIG. 6 is a view showing a movable range of the shift lens.

FIG. 6 shows a center K0 of the shift lens 10_1$a_2$, a correction limit range K1 which represents a shake correction limit range of the shift lens 10_1$a_2$, and a mechanical movable limit range K2 which represents a limit of the movable range of the shift lens 10_1$a_2$. Here, the shift lens 10_1$a_2$ reaches the correction limit range K1 in FIG. 6.

Moreover, FIG. 6 shows points P1, P2, P3, P4, and P5 which are determined by splitting a distance defined based on the lens center K0 and the correction limit range K1 into five pieces.

Here, since an amount of movement of the shift lens 10_1$a_2$ has a limitation, processing to pull the shift lens 10_1$a_2$, which has moved to a biased position from the center, back to the center is performed inclusive of processing to perform clipping (restricting at an upper limit) an integration value at a lens correction limit (the correction limit range K1). At the time of this processing, a shake correction effect is reduced in response to the processing. Accordingly, the correction effect is calculated based on the distance between the position of the moved shift lens 10_1$a_2$ and the center; and is displayed on the liquid crystal monitor 10_34. The processing will be described below with reference to FIG. 7.

Figure 7:
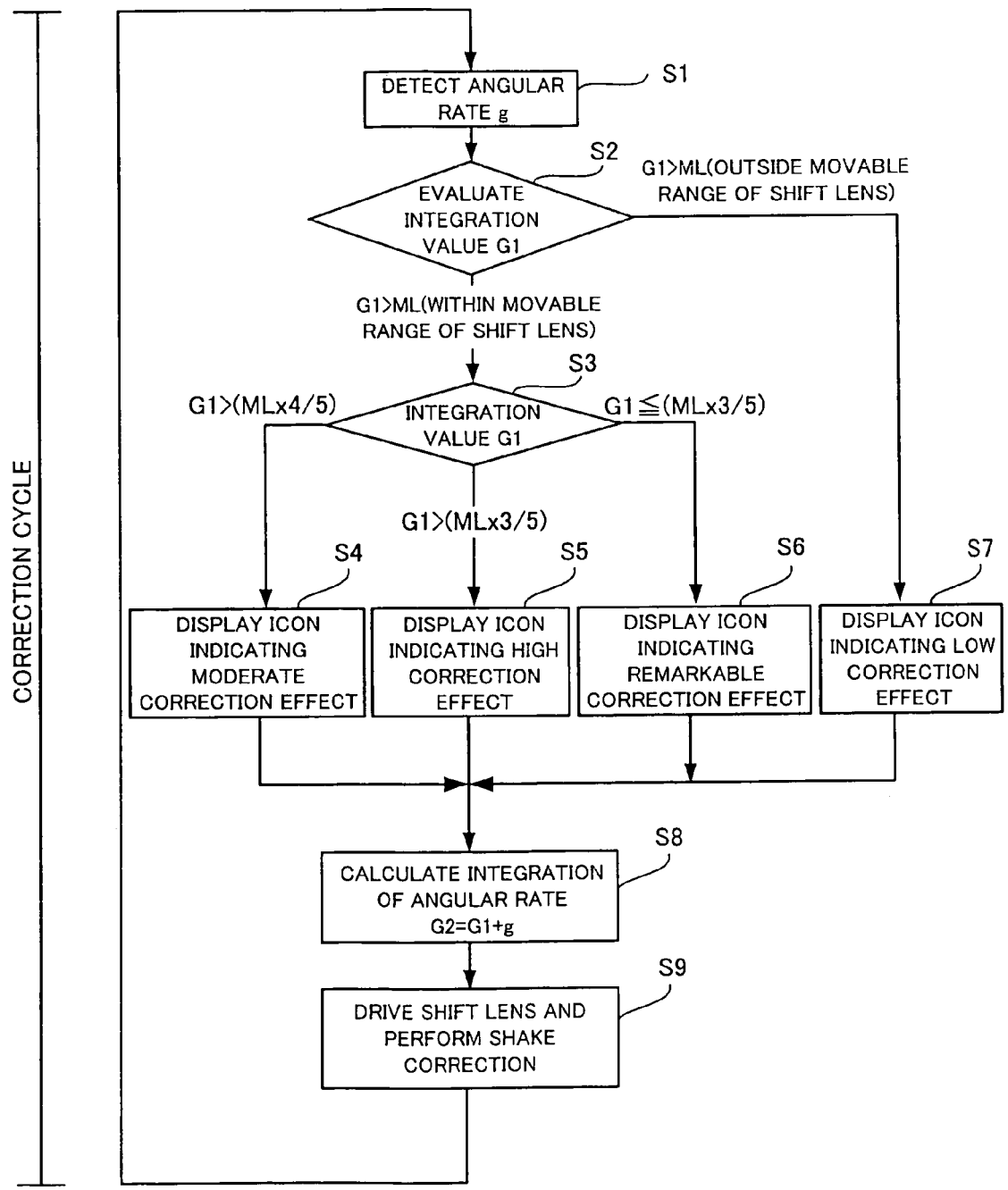
FIG. 7 is a flowchart of a processing routine to be repeatedly executed at a given time interval by a shake correcting section of the digital camera shown in FIG. 4.

FIG. 7 is a flowchart of a processing routine to be repeatedly executed at a given time interval by the shake correcting section of the digital camera shown in FIG. 4.

This processing routine is the processing routine of the correction cycle to be repeatedly executed at a given time interval by the shake correcting section when the digital camera 10 is turned on.

First, an angular rate g is detected by the angular rate sensor 10_55 in step S1.

Next, in step S2, an integration value G1 at a previous correction cycle is evaluated. Here, the integration value G is a value obtained by integrating the angular rate. To be more precise, the integration value G1 at the previous correction cycle is compared with an integration value ML when the shift lens 10_1$a_2$ reaches a correction limit (the correction limit range K1 shown in FIG. 6). Here, as shown in FIG. 6, the correction limit range K1 is set smaller than the mechanical movable limit range K2 in consideration of integration processing to be performed subsequently. As a result of comparison, when the integration value G1 is determined to be greater than the integration value ML (G1>ML), the shift lens 10_1$a_2$ is located outside the movable range. Accordingly, the processing goes to step S7. In step S7, an icon indicating a low correction effect for the shake is displayed and the processing goes to step S8 to be described later.

On the contrary, when the integration value G1 is determined to be equal to or below the integration value ML (G1≦ML), the shift lens 10_1$a_2$ is located in the movable range. Accordingly, the processing goes to step S3.

In step S3, the points P1, P2, P3, P4, and P5 are calculated by splitting the distance defined based on the lens center K0 and the correction limit range K1 into five pieces, and the processing goes to a relevant step thereto. To be more precise, the processing goes to step S4 in the case of the point P5 (G1>(ML×4/5)). The processing goes to step S5 in the case of the point P4 (G1>(ML×3/5)). The processing goes to step S6 in the case of the point P1, P2 or P3 (G1≦(ML×3/5)).

In step S4, an icon indicating a moderate correction effect for the shake is displayed and the processing goes to step S8. Meanwhile, in step S5, an icon indicating a high correction effect for the shake is displayed and the processing goes to step S8. In addition, in step S6, an icon indicating a remarkable correction effect for the shake is displayed and the processing goes to step S8.

In step S8, the integration value G2 (G2=G1+g) is calculated by adding the angular rate g calculated at the current correction cycle to the integration value G1 at the previous correction cycle. Then, the processing goes to step S9.

In step S9, shake correction is performed by moving the shift lens 10_1$a_2$ toward the center. Then, the processing returns to step S1.

Figure 8:
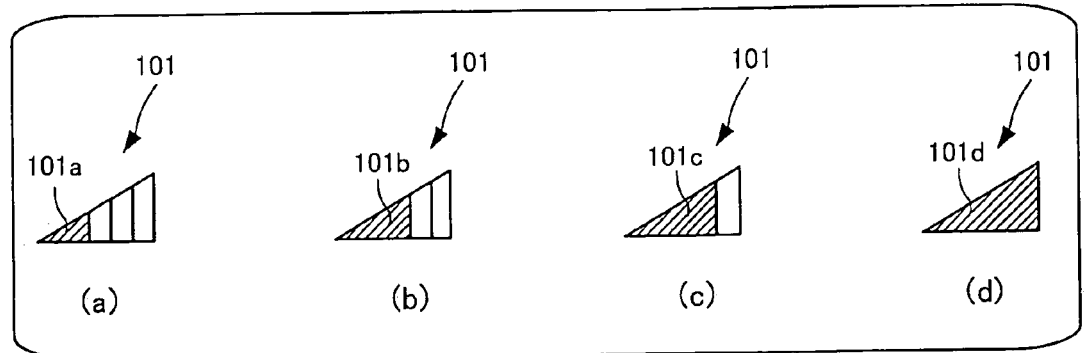
FIG. 8 is a view showing an icon formed of a bar graph for indicating a correction effect, which is displayed on a liquid crystal monitor in the processing routine shown in FIG. 7.

FIG. 8 is a view showing an icon formed of a bar graph for indicating the correction effect, which is displayed on the liquid crystal monitor in the processing routine shown in FIG. 7.

Part (a) of FIG. 8 shows an icon 101 displayed on the liquid crystal monitor 10_34 in step S7 shown in FIG. 7, which is formed of a bar graph configured to indicate the low correction effect for the shake by use of a shadowed section 101$a$. Meanwhile, part (b) of FIG. 8 shows the icon 101 displayed on the liquid crystal monitor 10_34 in step S4 shown in FIG. 7, which is formed of the bar graph configured to indicate the moderate correction effect for the shake by use of a shadowed section 101$b$. Moreover, part (c) of FIG. 8 shows the icon 101 displayed on the liquid crystal monitor 10_34 in step S5 shown in FIG. 7, which is formed of the bar graph configured to indicate the high correction effect for the shake by use of a shadowed section 101$c$. Meanwhile, part (d) of FIG. 8 shows the icon 101 displayed on the liquid crystal monitor 10_34 in step S6 shown in FIG. 7, which is formed of the bar graph configured to indicate the remarkable correction effect for the shake by use of a shadowed section 101d. A user can delay timing of shooting, zoom in the zoom lens $10\_1a_1$ from the telescopic side to the wide-angle side, and grip the image-taking device tightly in accordance with the icon 101 shown in parts (a) and (b) of FIG. 8. In this way, it is possible to shoot an image with little blur.

Figure 9:
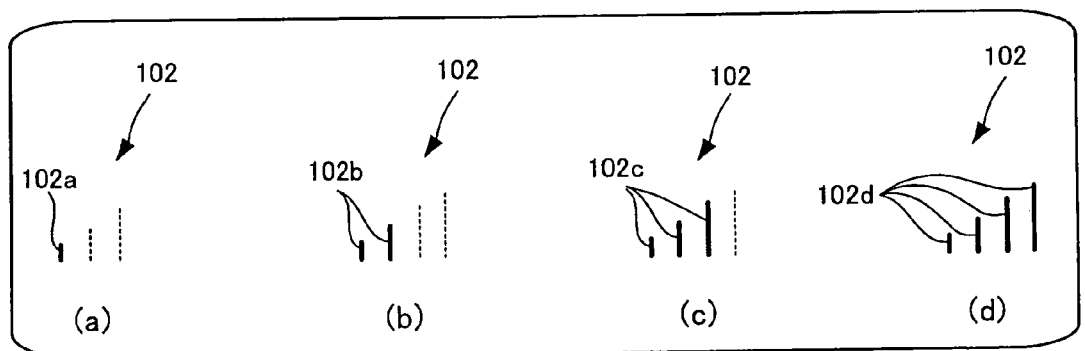
FIG. 9 is a view showing an icon formed of antenna bars.

FIG. 9 is a view showing an icon formed of antenna bars.

Part (a) of FIG. 9 shows an icon 102 which is formed of one antenna bar 102a indicating the low correction effect for the shake. Meanwhile, part (b) of FIG. 9 shows the icon 102 which is formed of two antenna bars 102b indicating the moderate correction effect for the shake. Moreover, part (c) of FIG. 9 shows the icon 102 which is formed of three antenna bars 102c indicating the high correction effect for the shake. Meanwhile, part (d) of FIG. 9 shows the icon 102 which is formed of four antenna bars 102d indicating the remarkable correction effect for the shake. In this way, it is also possible to display the correction effect by use of the icon 102 formed of the antenna bars.

Figure 10:
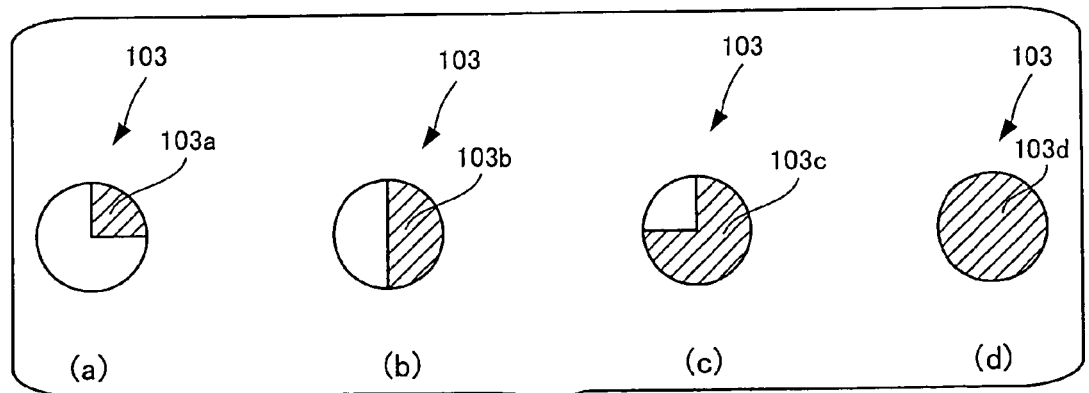
FIG. 10 is a view showing an icon formed of a pie chart.

FIG. 10 is a view showing an icon formed of a pie chart.

Part (a) of FIG. 10 shows an icon 103 which is formed of a pie chart configured to indicate the low correction effect for the shake by use of a shadowed section 103a. Meanwhile, part (b) of FIG. 10 shows the icon 103 which is formed of the pie chart configured to indicate the moderate correction effect for the shake by use of a shadowed section 103b. Moreover, part (c) of FIG. 10 shows the icon 103 which is formed of the pie chart configured to indicate the high correction effect for the shake by use of a shadowed section 103c. Meanwhile, part (d) of FIG. 10 shows the icon 103 which is formed of the pie chart configured to indicate the remarkable correction effect for the shake by use of a shadowed section 103d. In this way, it is also possible to display the correction effect by use of the icon 103 formed of the pie chart.

Figure 11:
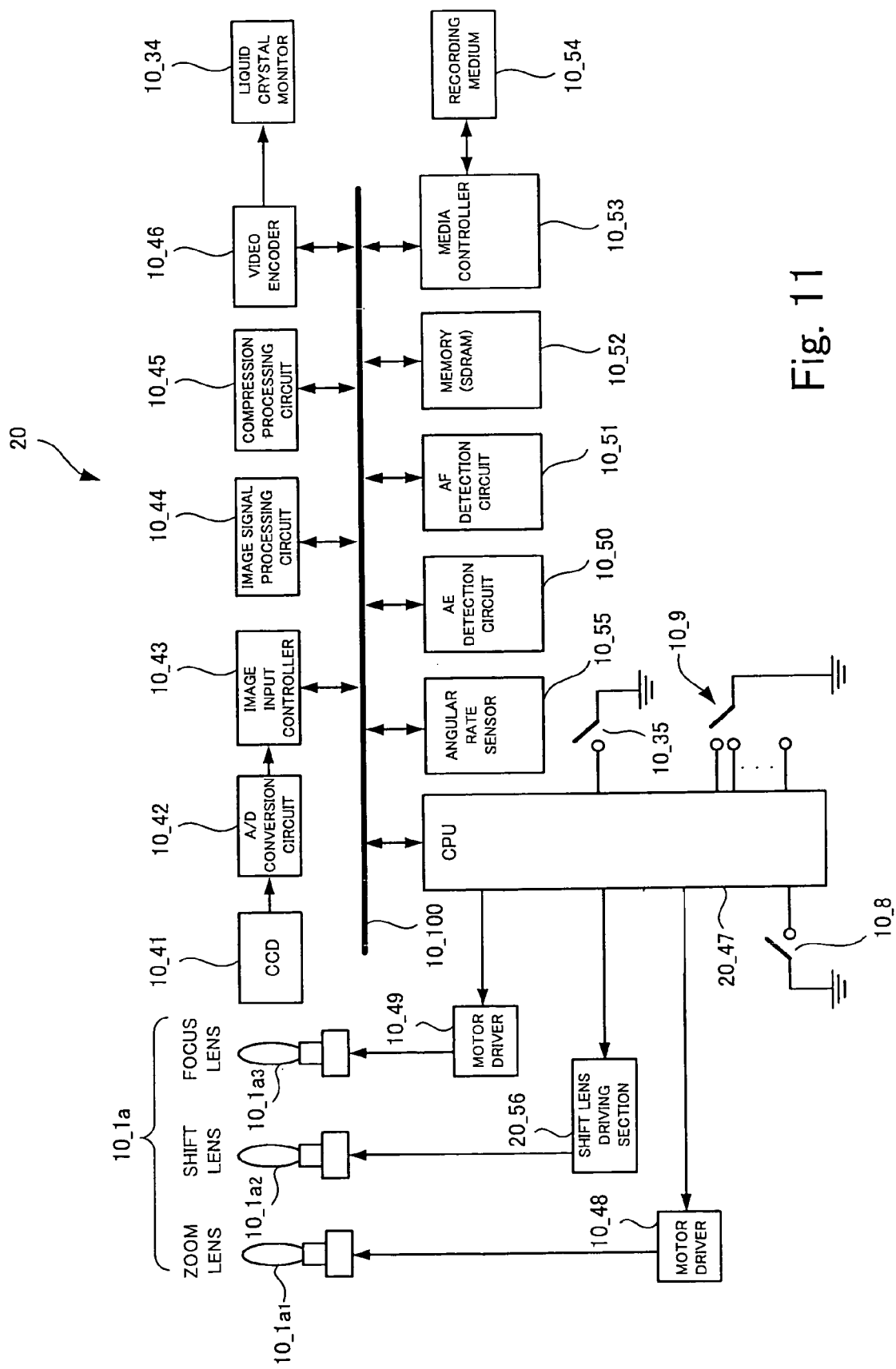
FIG. 11 is a block diagram showing a circuit configuration of a digital camera representing an image-taking device according to a second embodiment of the present invention.

FIG. 11 is a block diagram showing a circuit configuration of a digital camera representing an image-taking device according to a second embodiment of the present invention.

Here, external views of a digital camera 20 are the same as the external views of the digital camera 10 as shown in FIGS. 1, 2, and 3. Accordingly, illustration of the external views will be omitted herein.

As compared to the circuit configuration of the digital camera 10 shown in FIG. 4, the circuit configuration of the digital camera 20 shown in FIG. 11 has differences in a shift lens driving section 20_56 and a CPU 20_47.

The shift lens driving section 20_56 is configured to pull the shift lens $10\_1a_2$, which has moved to a biased position from a predetermined center, back to the center after shooting an image by use of a pullback force corresponding to the distance between the position of the moved shift lens $10\_1a_2$ and the center.

Meanwhile, the CPU 20_47 plays a role of calculating the correction effect based on the pullback force.

Here, as shown in FIG. 6, an amount of movement of the shift lens $10\_1a_2$ from the lens center K0 to the biased position is relatively small in the case of the point P1, P2 or P3. Accordingly, the pullback force for pulling the shift lens $10\_1a_2$ back to the center is also relatively small. Meanwhile, the amount of movement from the lens center K0 to the biased position is moderate in the case of the point P4. Accordingly, the pullback force for pulling the shift lens $10\_1a_2$ back to the center is also moderate. Moreover, the amount of movement from the lens center K0 to the biased position is relatively large in the case of the point P5. Accordingly, the pullback force for pulling the shift lens $10\_1a_2$ back to the center is also relatively large.

In this embodiment, a shake angle (the integration value×a coefficient) is calculated by integrating angular rate information from the angular rate sensor 10_55, and the shake is corrected by moving the shift lens $10\_1a_2$ in a direction of cancellation based on this shake angle. Here, since the amount of movement of the shift lens $10\_1a_2$ has a limitation, processing to pull the shift lens $10\_1a_2$, which has moved to the biased position from the center, back to the center by use of the pullback force corresponding to the distance between the position of the moved shift lens $10\_1a_2$ and the center is performed inclusive of the processing to perform clipping the integration value at the lens correction limit (the correction limit range K1). At the time of this processing, the shake correction effect is reduced in response to the processing. Accordingly, in this embodiment, the degree of the correction effect will be displayed on the liquid crystal monitor 10_34. The processing will be described below with reference to FIG. 12.

Figure 12:
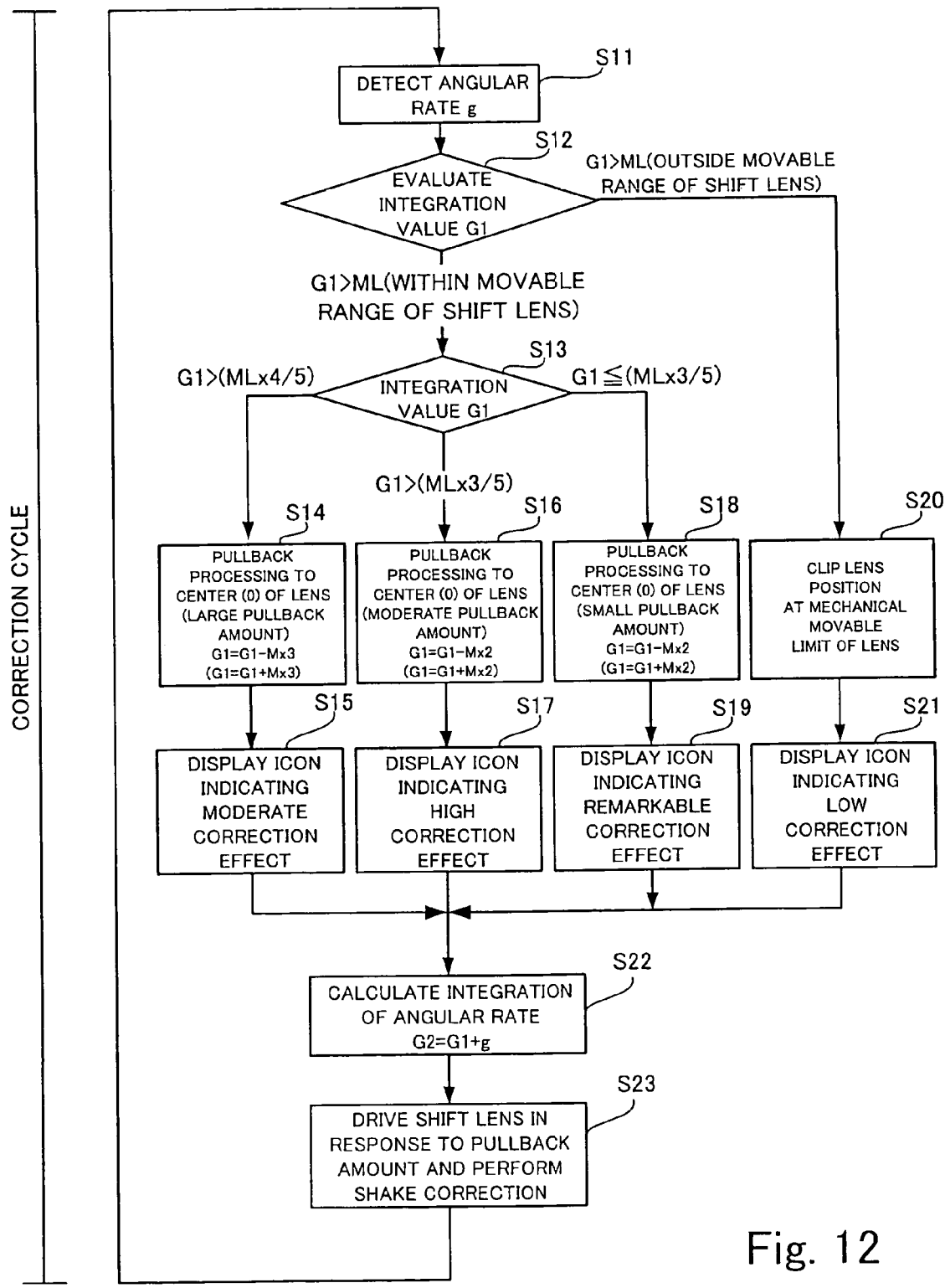
FIG. 12 is a flowchart of a processing routine to be repeatedly executed at a given time interval by a shake correcting section of the digital camera shown in FIG. 11.

FIG. 12 is a flowchart of a processing routine to be repeatedly executed at a given time interval by the shake correcting section of the digital camera shown in FIG. 11.

This processing routine is the processing routine of the correction cycle to be repeatedly executed at a given time interval by the shake correcting section when the digital camera 20 is turned on.

First, the angular rate g is detected by the angular rate sensor 10_55 in step S11.

Next, in step S12, an integration value G1 at a previous correction cycle is evaluated. To be more precise, the integration value G1 at the previous correction cycle is compared with the integration value ML when the shift lens $10\_1a_2$ reaches the correction limit range K1. As a result of comparison, when the integration value G1 is determined to be greater than the integration value ML (G1>ML), the shift lens $10\_1a_2$ is located outside the movable range. Accordingly, the processing goes to step S20 to be described later.

On the contrary, when the integration value G1 is determined to be equal to or below the integration value ML (G1≦ML), the shift lens $10\_1a_2$ is located in the movable range. Accordingly, the processing goes to step S13.

In step S13, the points P1, P2, P3, P4, and P5 (see FIG. 6) are calculated by splitting the distance defined based on the lens center K0 and the correction limit range K1 into five pieces, and the processing goes to a relevant step thereto. To be more precise, the processing goes to step S14 in the case of the point P5 (G1>(ML×4/5)). The processing goes to step S16 in the case of the point P4 (G1>(ML×3/5)). The processing goes to step S18 in the case of the point P1, P2 or P3 (G1≦(ML×3/5)).

Here, the position of the shift lens $10\_1a_2$ corresponds to the integration value G1. That is, when the integration value is equal to '0', the shift lens $10\_1a_2$ is positioned at the center. The shift lens $10\_1a_2$ is shifted farther from the center as the integration value G1 moves away from '0'. For this reason, a constant value M is set greater as the integration value G1 is greater. To be more precise, the constant value M is multiplied by an integer when the shift lens $10\_1a_2$ is largely deviated from the center, and the constant value M multiplied by the integer is subtracted from the integration value G1 (or added to the integration value G1 when the integration value G1 is negative). Meanwhile, the constant value M is subtracted from the integration value G1 when the shift lens $10\_1a_2$ is located in the vicinity of the center.

A processing which corresponds to "a large amount of lens pullback" for pulling the shift lens $10\_1a_2$ largely to the center (0) is performed in step S14. To be more precise, G1=G1−M×3 (or G1=G1+M×3) is calculated and the processing goes to step S15. In step S15, an icon indicating the moderate correction effect for the shake is displayed and the processing goes to step S22.

Meanwhile, a processing which corresponds to "a moderate amount of lens pullback" for pulling the shift lens $10\_1a_2$ moderately to the center (0) is performed in step S16. To be more precise, G1=G1−M×2 (or G1=G1+M×2) is calculated and the processing goes to step S17. In step S17, an icon indicating the high correction effect for the shake is displayed and the processing goes to step S22.

In addition, a processing which corresponds to "a small amount of lens pullback" for pulling the shift lens $10\_1a_2$ slightly to the center (0) is performed in step S18. To be more precise, G1=G1−M (or G1=G1+M) is calculated and the processing goes to step S19. In step S19, an icon indicating the remarkable correction effect for the shake is displayed and the processing goes to step S22.

In the meantime, when the processing goes to step 20 as a result of determination that the integration value G1 is greater than the integration value ML in step S12, the position of the shift lens $10\_1a_2$ is subjected to clip processing in the mechanical movable limit range K2, and then the processing goes to step S21. In step S21, an icon indicating the low correction effect for the shake is displayed and the processing goes to step S22.

In step S22, the integration value G2 (G2=G1+g) is calculated by adding the angular rate g calculated at the current correction cycle to the integration value G1 at the previous correction cycle. Then, the processing goes to step S23.

In step S23, shake correction is performed by moving the shift lens $10\_1a_2$ in response to the amount of pullback. Then, the processing returns to step S11.

As described above, the second embodiment is configured to increase the pullback force more as the shift lens $10\_1a_2$ is positioned farther from the predetermined center and to calculate the correction effect by use of the pullback force as a parameter. Accordingly, it is possible to pull back the shift lens $10\_1a_2$ in a short time period and to calculate the correction effect easily.

Figure 13:
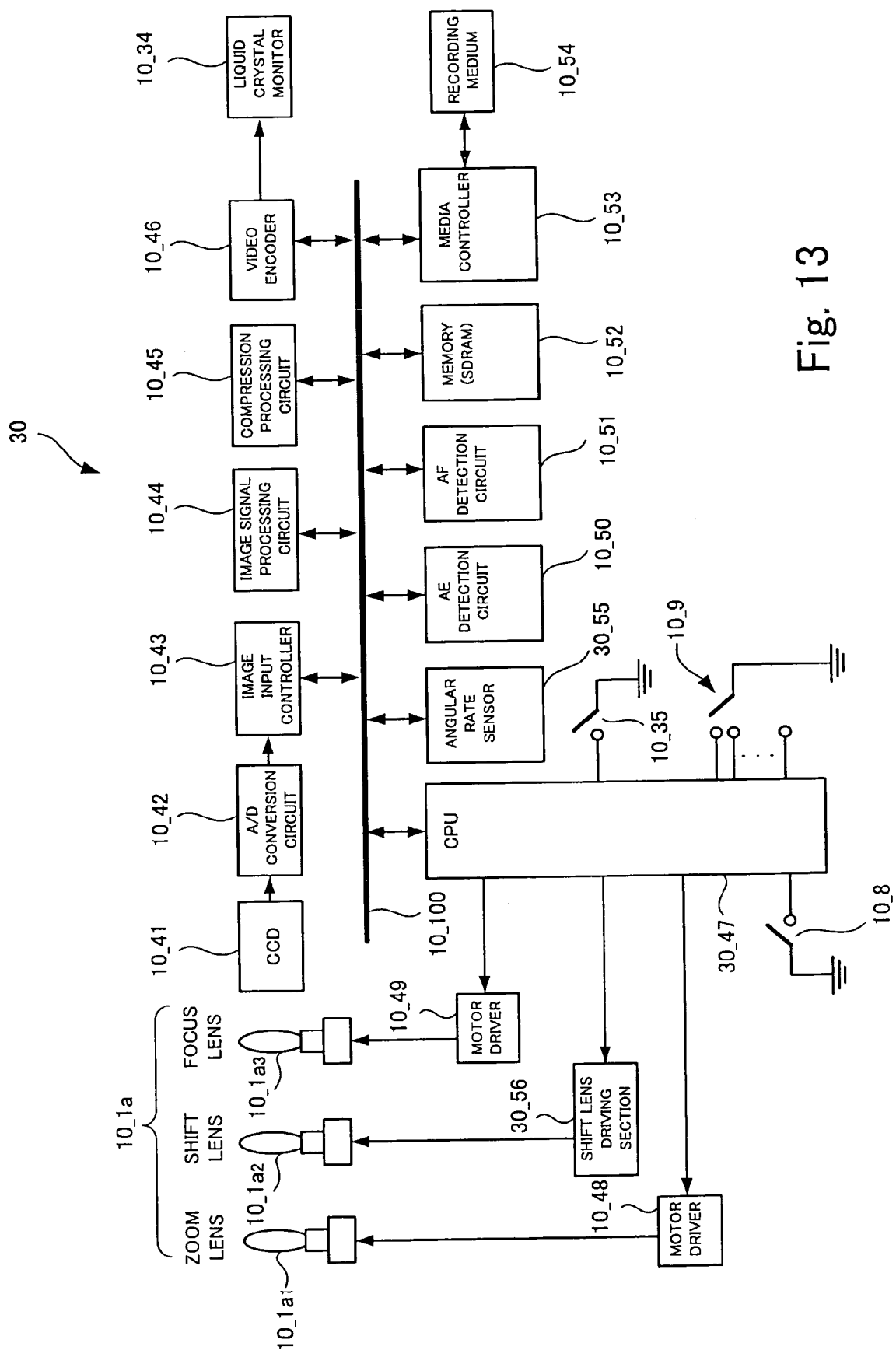
FIG. 13 is a block diagram showing a circuit configuration of a digital camera representing an image-taking device according to a third embodiment of the present invention.

FIG. 13 is a block diagram showing a circuit configuration of a digital camera representing an image-taking device according to a third embodiment of the present invention.

Here, external views of a digital camera 30 are the same as the external views of the digital camera 10 as shown in FIGS. 1, 2, and 3. Accordingly, illustration of the external views will be omitted herein. As compared to the circuit configuration of the digital camera 10 shown in FIG. 4, the circuit configuration of the digital camera 30 shown in FIG. 13 has differences in an angular rate sensor 30_55, a shift lens driving section 30_56, and a CPU 30_47. Here, the angular rate sensor 30_55, the shift lens $10\_1a_2$, the shift lens driving section 30_56, the CPU 30_47, and the liquid crystal monitor 10_34 collectively constitute another example of the shake correcting section of the present invention, which has the correction effects at different levels depending on a frequency of the shake.

The angular rate sensor 30_55 detects the shake in terms of respective frequency components.

Meanwhile, the CPU 30_47 calculates the correction effects based on the shake in terms of the respective frequency components and the level of the correction effect corresponding to the frequency of the shake. The calculated correction effect is displayed on the liquid crystal monitor 10_34.

Upon shake correction control, it is difficult to obtain a uniform correction effect in terms of all shake frequencies. The frequency of a shake caused by a human is concentrated in a range from 1 Hz to 15 Hz. The shake correction is usually controlled to maximize the correction effect at a specific frequency (H) in this range.

Figure 14:
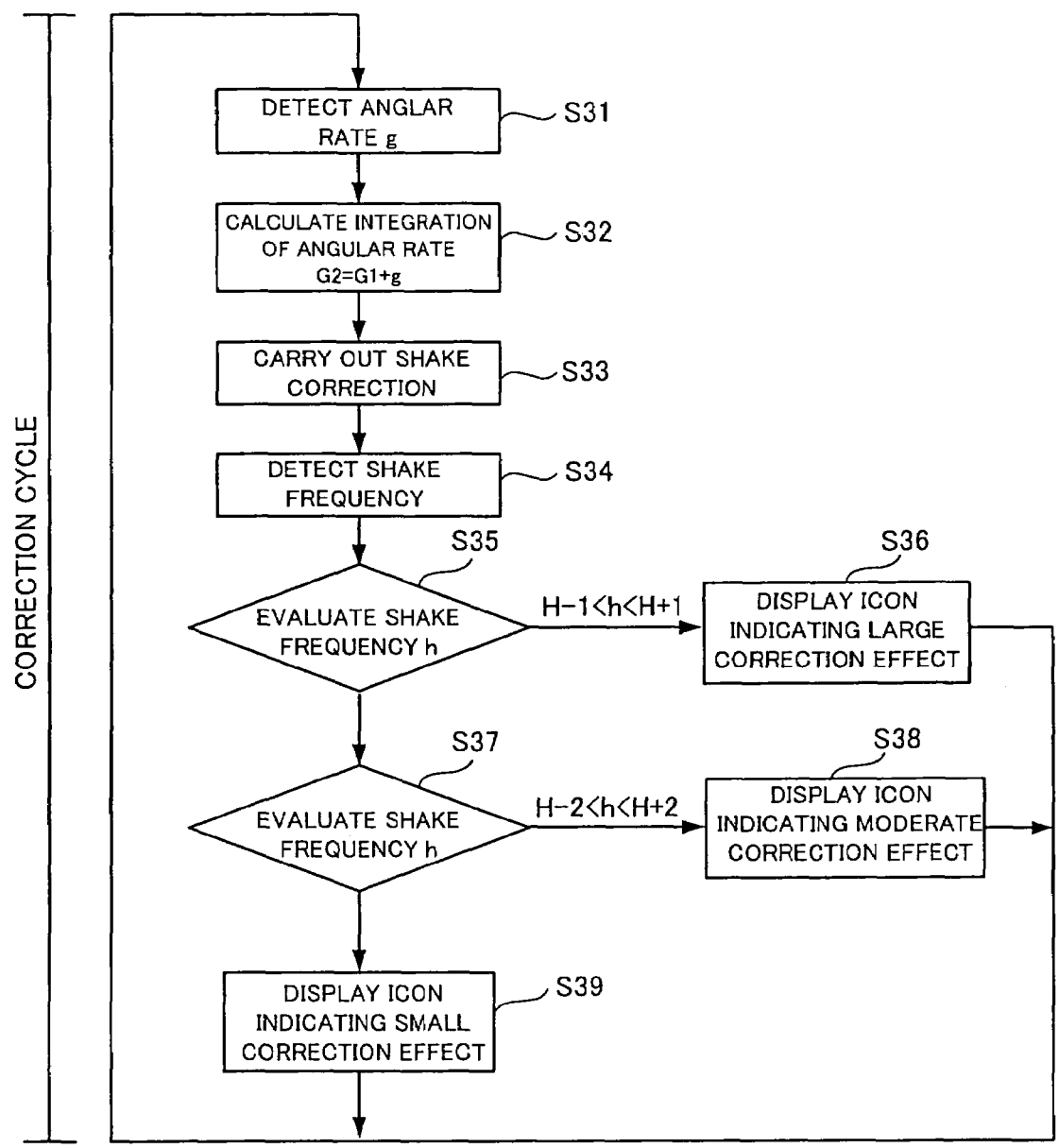
FIG. 14 is a flowchart of a processing routine to be repeatedly executed at a given time interval by a shake correcting section of the digital camera shown in FIG. 13.

FIG. 14 is a flowchart of a processing routine to be repeatedly executed at a given time interval by the shake correcting section of the digital camera shown in FIG. 13.

This processing routine is the processing routine of the correction cycle to be repeatedly executed at a given time interval by the shake correcting section when the digital camera 30 is turned on.

First, the angular rate g is detected by the angular rate sensor 30_55 in step S31.

Next, in step S32, the integration value G2 (G2=G1+g) is calculated by adding the angular rate g calculated at the current correction cycle to the integration value G1 at the previous correction cycle. Then, the processing goes to step S33.

Moreover, shake correction is performed in step S33 by moving the shift lens $10\_1a_2$.

In addition, shake frequency detection is performed in step S34. To be more precise, the frequency detection is performed by counting the number of output values from the angular rate sensor 30_55 crossing a given threshold (S) within a given period. Here, the threshold (S) is provided with a hysteresis in order to prevent erroneous detection of a frequency generated due to noises contained in the values outputted from the angular rate sensor 30_55.

Next, a shake frequency h is evaluated in step S35. To be more precise, a judgment is made as to whether or not a difference between the shake frequency h and the frequency (H) for maximizing the correction effect is within 1 Hz (H−1<h<H+1). The processing goes to step S36 when the difference between the shake frequency h and the frequency (H) is determined to be within 1 Hz (H−1<h<H+1). In step S36, an icon indicating a large correction effect is displayed and the processing returns to step S31.

On the other hand, the processing goes to step S37 when the shake frequency h is determined to be a frequency which is lower by 1 Hz or below or higher by 1 Hz or above than the frequency (H) for maximizing the correction effect.

In step S37, the shake frequency h is evaluated further. To be more precise, a judgment is made as to whether or not the difference between the shake frequency h and the frequency (H) for maximizing the correction effect is within 2 Hz (H−2<h<H+2). The processing goes to step S38 when the difference is determined to be within 2 Hz (H−2<h<H+2). In step S38, an icon indicating a moderate correction effect is displayed and the processing returns to step S31.

Meanwhile, the processing goes to step S39 when the shake frequency h is determined to be a frequency which is lower by 2 Hz or below or higher by 2 Hz or above than the frequency (H) for maximizing the correction effect. In step S39, an icon indicating a small correction effect is displayed and the processing returns to step S31.

As described above, the third embodiment is configured to calculate the correction effect for the shake based on the shake frequency and to display the correction effect on the liquid crystal display 10_34. Accordingly, the user can pay attention not to generate vibration which may adversely affect image shooting or avoid image shooting under a condition where there is a large amount of vibration.

The embodiments describe the examples in which the shake is corrected by moving the shift lens $10\_1a_2$ in the lateral direction of the digital camera 10. However, the present invention is not limited only to the foregoing examples. It is also possible to correct the shake by moving the shift lens $10\_1a_2$ in the vertical direction of the digital camera 10. Alternatively, it is also possible to correct the shake by moving the shift lens 10_1a$_2$ both in the lateral direction and in the vertical direction of the digital camera 10.

Moreover, the embodiments describe the examples in which the shift lens 10_1a2 to be disposed between the zoom lens 10_1a1 and the focus lens 10_1a3, which collectively constitute the shooting lens 10_1a, is applied to the correcting member of the present invention. However, the present invention is not limited only to the foregoing examples. It is possible to apply a correcting member which is independent from the lens members in the image-taking optical system. Alternatively, it is also possible to apply an image pickup device (a CCD) configured to correct a shake by traveling within a predetermined moving range.

In addition, the embodiments describe the examples applied to a digital camera. However, the present invention is not limited only to the foregoing examples. The present invention is also applicable to a camera-equipped cellular telephone, a video camera, and the like.

What is claimed is:

1. An image-taking device configured to focus an object image on an image pickup device by use of an image-taking optical system and to generate an image signal for recording in response to a shooting instruction, the image-taking device comprising:
    a shake correcting section which corrects a shake when shooting an image, wherein the shake correcting section includes:
        a shake detecting section which detects the shake;
        a correcting member which travels within a predetermined moving range and corrects the shake;
        a correcting member driving section which moves the correcting member so as to correct the shake detected by the shake detecting section;
        a correction effect calculating section which calculates a correction effect for the shake, wherein the correction effect indicates how much of the shake has been corrected; and
        a correction effect displaying section which displays an icon indicating the correction effect obtained by the correction effect calculating section.

2. The image-taking device according to claim 1,
wherein the correcting member driving section pulls the correcting member, which has moved to a biased position from a predetermined center, back to the center after shooting an image, and
the correction effect calculating section calculates the correction effect based on a distance between the biased position of the correcting member and the center.

3. The image-taking device according to claim 1,
wherein the correcting member driving section pulls the correcting member, which has moved to a biased position from a predetermined center, back to the center after shooting an image by use of a pullback force corresponding to a distance between the biased position of the correcting member and the center, and
the correction effect calculating section calculates the correction effect based on the pullback force.

4. The image-taking device according to claim 1,
wherein the shake correcting section has the correction effects at different levels depending on a frequency of the shake,
the shake detecting section detects the shake depending on each of frequency components, and
the correction effect calculating section calculates the correction effect for the shake based on the shake depending on each of frequency components detected by the shake detecting section and the level of the correction effect corresponding to the frequency of the shake achieved by the shake correcting section.

5. The image-taking device according to claim 1,
wherein the correction effect calculating section calculates the correction effect based on an integrated value of a predetermined period in the past.

6. The image-taking device according to claim 1,
wherein the correction effect calculating section calculates the correction effect by use of multiple samplings including the present.

7. The image-taking device according to claim 1,
wherein the correction effect calculating section calculates the correction effect by use of multiple samplings excluding the present.

8. The image-taking device according to claim 1, wherein the icon is formed of a bar graph.

9. The image-taking device according to claim 1, wherein the icon is formed of antenna bars.

10. The image-taking device according to claim 1, wherein the icon is formed of a pie chart.

* * * * *